Figure 1:
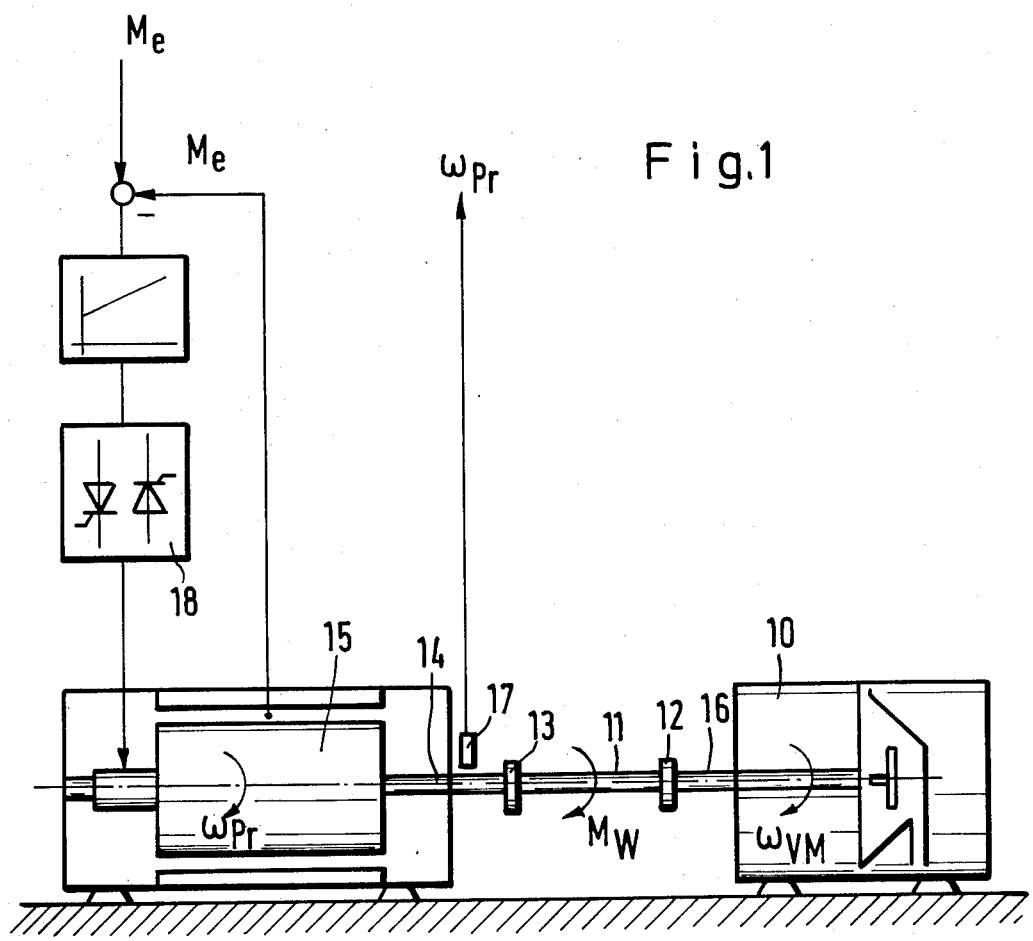

United States Patent [19]

von Thun

[11] Patent Number: 4,621,524

[45] Date of Patent: Nov. 11, 1986

[54] CIRCUIT LAYOUT FOR THE SIMULATION OF MOMENTS OF INERTIA ON TEST STANDS

[75] Inventor: Hans-Jurgen von Thun, Hemsbach, Fed. Rep. of Germany

[73] Assignee: Brown, Boveri, and Cie A.G., Mannheim, Fed. Rep. of Germany

[21] Appl. No.: 730,644

[22] Filed: May 6, 1985

[30] Foreign Application Priority Data

May 4, 1984 [DE] Fed. Rep. of Germany ....... 3416496

[51] Int. Cl.$^4$ .......................................... G01M 15/00
[52] U.S. Cl. ..................................... 73/116; 73/866.4
[58] Field of Search .............. 73/432 SD, 116, 862.17, 73/862.18, 660, 117, 118

[56] References Cited

U.S. PATENT DOCUMENTS

| 3,712,127 | 1/1973 | Petersen | 73/118 |
| 4,327,578 | 5/1982 | D'Angelo | 73/862.18 X |
| 4,457,165 | 7/1984 | Wiederrich | 73/116 |

FOREIGN PATENT DOCUMENTS 3225035  5/1982  Fed. Rep. of Germany .

OTHER PUBLICATIONS

"Simulating the Dynamic Performance of the Engine by an Electric Motor Serving as Test Rig Drive", Hans-Juergen von Thun, Electronics for National Security Conference, Sep. 27-29, 1983, pp. 397-411.
"Bremsenpruefstand mit Schwung-Massensimulation", Hans-Juergen von Thun, Antriebstechnik, 1981, No. 6, pp. 49-53.

Primary Examiner—Jerry W. Myracle
Attorney, Agent, or Firm—Robert J. Koch

[57] ABSTRACT

Test stands for automotive vehicles at the present are required in most cases to permit dynamic tests wherein an essential criterion consists of the simulation of the actual vehicle inertia moment, in order to obtain a realistic acceleration behavior. The test stand normally has a constant inertia moment. A process and a circuit layout is proposed for the simulation of vehicle inertia moments, whereby the test stand and the test specimen represent a n-mass oscillator, the masses of which are elastically joined together. By means of electronic functional elements (24, 25, 27, 32, 33, and 34), an m number of further masses are imitated electronically so that the regulation technical structure corresponds to the differential equation system of a (n+m) mass system. An air gap moment controlled electric machine is used as the transmission element (34) between the electric functional elements (24, 25, 27, 32, 33, and 34) and the mechanical masses. By setting the time constants ($T_{Kfz}$, $T_{CKfz}$) and the amplification factors ($K_{dKfz}$) of the functional elements (24, 25, and 27), the vehicle vibration behavior (natural frequency, attenuation) may also be imitated, in addition to the simulation of the vehicle inertia moment.

17 Claims, 7 Drawing Figures

CIRCUIT LAYOUT FOR THE SIMULATION OF MOMENTS OF INERTIA ON TEST STANDS

BACKGROUND OF THE INVENTION

1. Field of the Invention

The invention relates to a process and a circuit layout for the simulation of test stand inertia moments wherein the test stand and the specimen represent an n-mass oscillator, the masses of which are elastically joined together.

2. Background of the Art

In order to obtain realistic acceleration behavior, test stands for automotive components (for example, engines, gears, axles) are at present for the most part expected to allow dynamic tests in which an essential criterion is the simulation of the actual moment of inertia of the vehicle.

The moment of inertia of the vehicle may be simulated mechanically by appropriate disk flywheels mounted on the test stand. However, this method, which is frequently used on brake test benches, is very uncomfortable and does not allow variations of the moment of inertia during operation. If for example the test specimen is an internal combustion engine, it moves against a rigidly coupled disk flywheel, while in the case of the vehicle, the mass of the vehicle is joined elastically by means of the elasticities of the tires, axles, drive gears and shaft with the engine. The specimen is therefore loaded on a test stand of this type in a dynamically incorrect manner.

Test stands are being constructed further on which the moment of inertia is simulated by an electric machine. Different control and regulating algorithms are known, whereby the vehicle inertia moment desired is to be simulated.

The paper by Hans-Jurgen von Thun, having a German language title which translates as "Brake Test Stand with Disk Flywheel Simulation", published in the German journal *Elektro-Anzeiger*, No. 34, (1981), pages 49 to 53, describes a process for mass simulation, wherein it is assumed that the moment produced by the test specimen may be measured without reaction. In the case of many types of test stands, in particular with engine test stands, this is possible only at great expense or not at all, so that for such test stands the process described in the paper is not applicable.

To simulate the dynamic behavior of internal combustion engines, Hans-Jurgen von Thun described a process providing for electric inertia moment simulation, which is multiplied by the angular acceleration of the test stand in a paper entitled "Simulation of the Dynamic Performance of the Engine By an Electric Motor Serving as Test Rig Drive", Conference Proceedings of Electronics for National Security, pages 397 to 411, Sept. 27-29, 1983, Brussels, Belgium. The simulation moment formed in this manner is communicated to the electric test stand machine as the reference value. In this process the rpm signal of the test stand must be differentiated. The simulation circuit produces a retroaction because of the use of the angular acceleration; it possesses stability and dynamic restrictions which become apparent particularly in the case of simulated inertia moments deviating strongly upward and downward from the mechanically present moment of inertia.

West German Offenlegungsschrift No. 32 25 035 describes an apparatus for the testing of a torque generator. The shaft is coupled in normal operation to a load charged with inertial moment. The process upon which this apparatus is based, again does not operate, as stated, with signals free of retroaction. As proof of the signals free of retroaction is presented in the form of equations, which do not contain the dynamic components of the measuring shaft signal (page 11, bottom), it is stated that the mass of the specimen is connected rigidly with the electric drive machine of the test stand. This, however, is not true for highly dynamic systems. Furthermore, the process described therein does not represent anything novel in relation to dynamics and stability. Merely different signals obtained in a more cumbersome manner are used for simulation than those of the process described in the preceding paragraph. The process according to West German Offenlegungsschrift No. 32 25 035 is thus subject to the same stability and dynamic restrictions as the process described in the preceding paragraph.

It is an object of the invention to provide a process and a circuit layout for the simulation of dynamic torque components, in particular the simulation of test stand inertia moments, whereby the quality of simulation is improved. In the process the elastic joining to the specimen is to be taken into consideration as it exists in the actual vehicle. This is especially true in view of the newer test methods wherein the effect of the dynamics of the entire vehicle on the test specimen is to be observed. A rigid coupling of the inertia moments to be simulated to the mechanically present masses of the test stand and the specimen is disadvantageous, as there are simply no determined parameters for new natural frequencies and the attenuation which should be taken into consideration in the case of altered spring-mass systems. There exists therefore no degree of freedom in the vicinity of the limits of stability. The invention is intended to remedy this situation.

This object is attained according to the invention for a process and a circuit layout for the simulation of test stand inertia moments, in which the test stand and the test specimen represent an n-mass oscillator; the masses whereof are coupled with each other mechanically (spring constant $C_{n-1}$ and attenuation measures $d_n$) by means of analog and/or digital electronic functional elements; m further masses with spring constants; and attenuations are simulated electrically in a manner such that the structure corresponds to the system of differential equations of the (n+m) mass system; and at least one moment controlled electric machine is used as a transmission element between the electronic functional elements and the mechanical masses.

The process shall be described herein by means of the example of an internal combustion engine test stand, which is to simulate the entire gear train of the vehicle with respect to the torsional movement. Obviously, the process is suitable also for other types of test stands where inertia moments are to be simulated.

Figure 2:
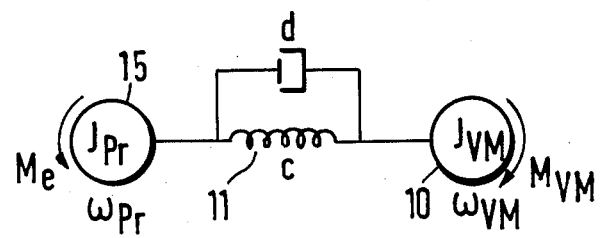
Figure 3:
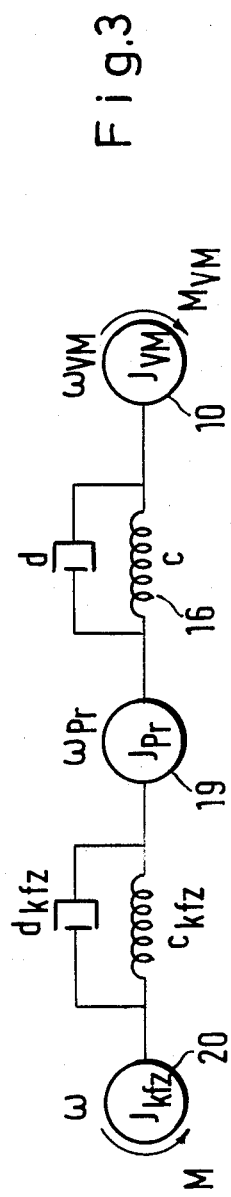
Figure 4:
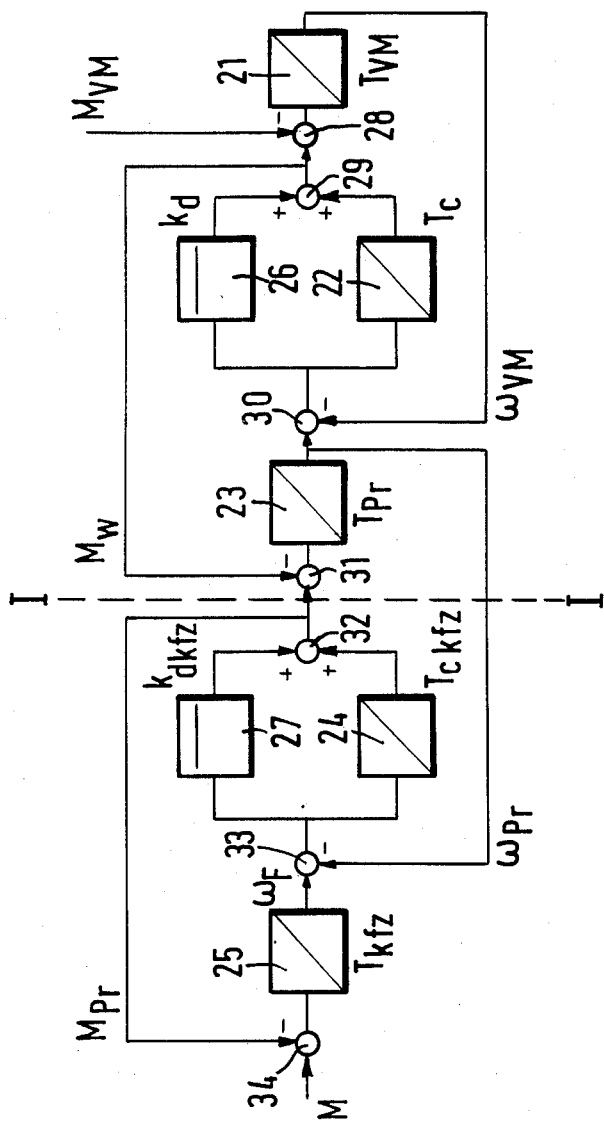
Figure 5:
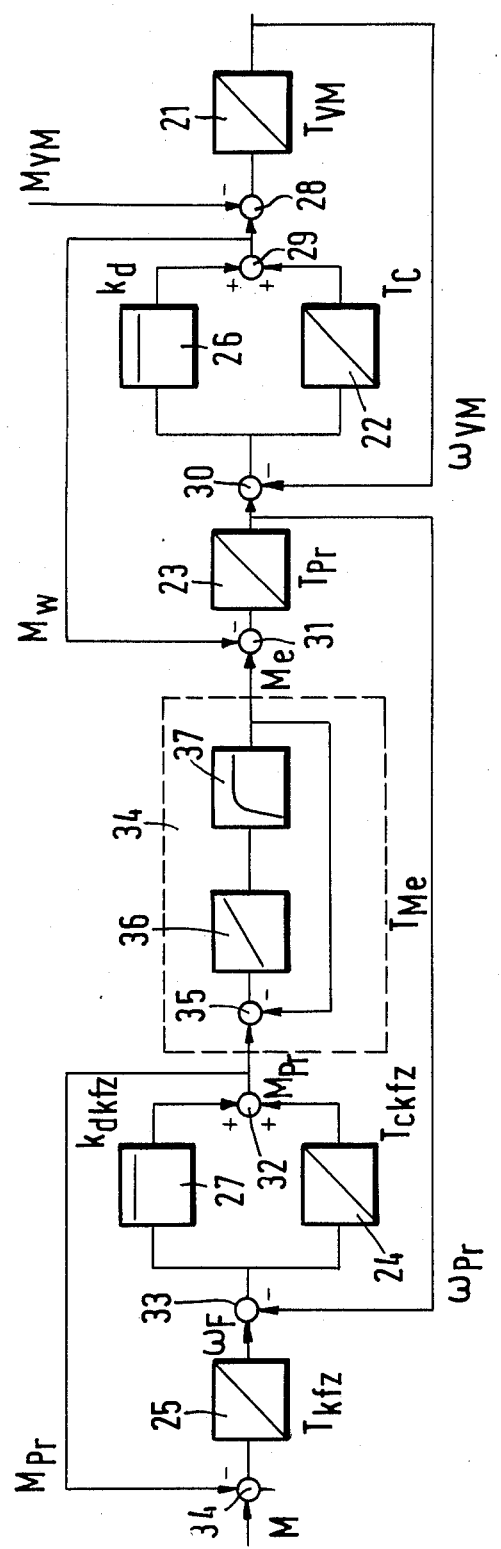
Figure 6:
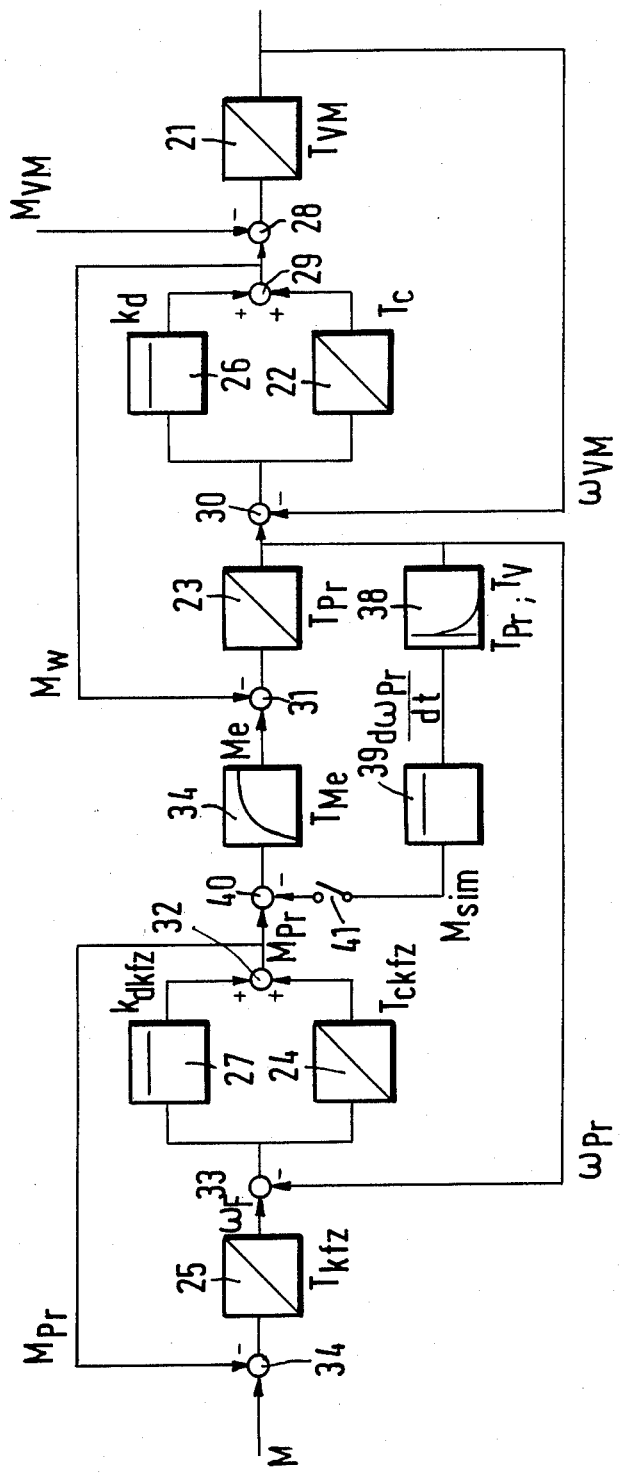
Figure 7:
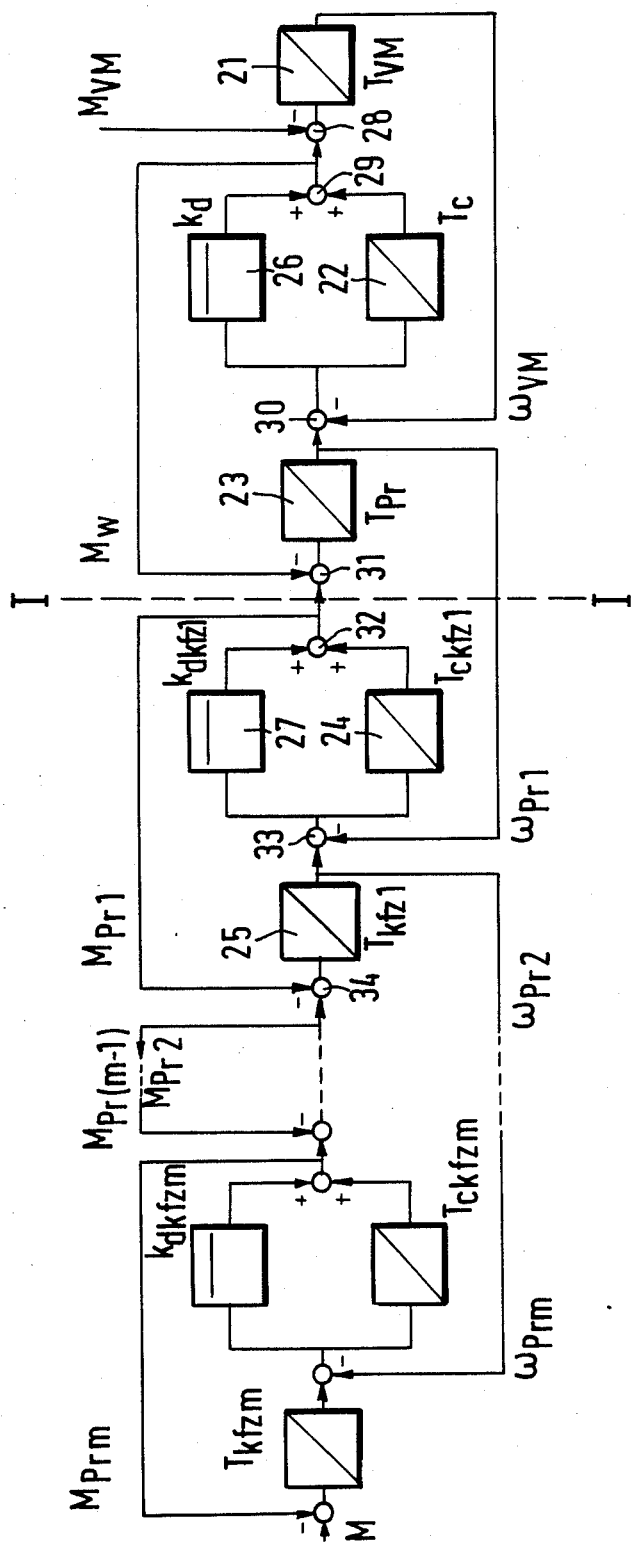

FIG. 1 shows a fundamental test stand configuration.
FIG. 2 shows a representation of a 2-mass oscillator.
FIG. 3 shows a 3-mass system.
FIG. 4 shows additional elements of a 3-mass system.
FIGS. 5, 6 and 7 show additional elements used in connection with the simulation process of the invention.

FIG. 1 shows a corresponding fundamental test stand configuration. An internal combustion engine (specimen) is connected by means of an elastic shaft 11 containing two clutches 12, 13, with the driven shaft 14 of an electric machine 15. The internal combustion machine 10 generates by means of chemical combustion a torque $M_{VM}$. The inertia moment of the engine is designated by $J_{VM}$. The drive shaft 16 of the internal combustion engine 10 rotates at an angular velocity of $\omega_{VM}$. The electric machine 15 produces by means of the electric power input or output a torque $M_e$. Its drive shaft 14 rotates with a test stand angular velocity of $\omega_{Pr}$; it may be measured by a rpm meter 17. The moment of inertia of the test stand, i.e., of the electric machine 15, the shaft 11 and the clutches 12, 13, is designated $J_{Pr}$, and the shaft moment transmitted between the internal combustion engine 10 and the electric machine 16 by $M_W$.

The electric machine preferably consists of a fully metal-clad dc shunt machine with a 6-pulse three-phase bridge 18 and a moment computer, adjusted to the loss corrected air gap moment $M_e$. The control of moments by means of machines of this type permits the fastest possible conversion of the calculated moment reference value to the corresponding machine moment. For example, in case of an abrupt reference value input, the machine moment rises from zero to the maximum moment in 10 to 20 ms. Furthermore, the air gap moment may be determined with a high accuracy from the electric power input using a moment computer.

A test stand layout according to FIG. 1 may be represented in a simplified manner by assigning the masses of the shaft 11 and the clutches 12, 13 to the mass of the test stand, representing a 2-mass oscillator (FIG. 2), wherein the mass of the specimen 10 and the mass of the test stand 15 are joined together by means of an electric shaft 11, 14. The elastic shaft 11, 14 has a spring constant C and a measure of attenuation d. A disk flywheel could now be joined with the test stand inertia moment $J_{Pr}$, which together with $J_{Pr}$, simulates the moment of inertia of the vehicle $J_{Kfz}$ (state of the art). Here, the spring attenuation behavior of the coupled element can be adapted only with difficulty or not at all to the values desired of the vehicle to be simulated.

The invention proposes to effect an inertia moment simulation by coupling a number n of additional masses to the mechanical n-mass oscillator (a 2-mass oscillator) according to FIG. 2, the masses being simulated by electronic functional elements. The electric machine 15 serves as the transmission element between the electronic functional elements and the mechanical masses.

In order to be able to explain the invention clearly, it is advantageous to chose n=2 and m=1. In particular, m=1 does not represent a restriction here. (For a dynamically detailed simulation of the vehicle, m may be greater than 1 according to FIG. 7, together with a corresponding number of masses, springs and attenuations being simulated in the electronic functional elements.) The explanation thus concerns a 3-mass system, as shown in FIG. 3: the gear train of the vehicle consists of several masses, joined together elastically. The inertia moment $J_{VM}$ of the specimen 10 (internal combustion engine) is connected by means of the elastic engine shaft 16 (spring constant C, attenuation measure d) with the inertia moment $J_{Pr}$ of the gear inlet 19. The rest of the inertia moment of the vehicle $J_{Kfz}$ is connected through the gear, axle and tire elasticity (spring constant $C_{Kfz}$, attenuation measure $d_{Kfz}$) with the two inertia moments 19 and 10. The internal combustion engine 10 produces a torque $M_{VM}$ and the automotive vehicle loads the drive gear with the torque $M_{Last}$ (for example, ascent, rolling and air resistance).

The system of differential equations for a 3-mass oscillator of this type is written in a representation standardized for the nominal moment $M_n$ and the nominal angular velocity n, as follows:

$$T_{Kfz} \cdot d\omega_F/dt + k_{dKfz} \cdot (\omega_F - \omega_{Pr}) + \frac{1}{T_{CKfz}} \int (\omega_F - \omega_{Pr}) \cdot dt = M_{Last}$$

$$T_{Pr} \cdot d\omega_{Pr}/dt - k_{dKfz} \cdot (\omega_F - \omega_{Pr}) - \frac{1}{T_{CKfz}} \int (\omega_F - \omega_{Pr}) \cdot dt + k_d \cdot (\omega_{Pr} - \omega_{VM}) + \frac{1}{T_C} \int (\omega_{Pr} - \omega_{VM}) \cdot dt = 0$$

$$T_{VM} \cdot d\omega_{VM}/dt \underbrace{- k_d \cdot (\omega_{Pr} - \omega_{VM})}_{\text{Attenuation Moments}} \underbrace{- \frac{1}{T_C} \int (\omega_{Pr} - \omega_{VM}) \cdot dt}_{\text{Spring Moments}} = \underbrace{-M_{VM}}_{\text{External Moments}}$$

(Acceleration Moments / Attenuation Moments / Spring Moments)

Herein, $T_{Tfz} = J_{Kfz} \cdot \omega_n / M_n$ with corresponding relationships for $T_{Pr}$ and $T_{VM}$, $k_{dKfz} = d_{Kfz} \cdot \omega_n / M_n$ with a corresponding relationship for $k_d$ and $1/T_{CKfz} = C_{Kfz} \cdot \omega_n / M_n$ with a corresponding relationship for $1/T_C$.

A graphical representation of this system of differential equations as a signal flow sheet yields a structure according to FIG. 4. This diagram represents the integrators 21, 22, 23, 24 and 25 which integrate their input signals with the prevailing time constant T. It contains further the proportional elements 26 and 27, which multiply their input signal by the amplification factor $K_d$ or $k_{dKfz}$, respectively. The diagram further displays the comparison and summation locations 28, 29, 30, 31, 32, 33 and 34, wherein the prevailing input signals are respectively subtracted or added.

To the internal combustion engine 10 with the inertia moment $J_{VM}$, a total vehicle inertia moment $J^*_{Kfz}$ is joined, which is given by the test stand inertia moment and the residual vehicle inertia moment $J_{Kfz}$ as $$J^*_{Kfz} = J_{Pr} + J_{Kfz}.$$

The novel simulation process is based on the concept that the mechanical part of the test stand and the specimen 10 is represented as a 2-mass system according to the part to the right of the line I—I in FIG. 4. The left hand part is simulated advantageously by means of the following electronic functional elements:

The remaining vehicle inertia moment $J_{Kfz}$ is simulated by an integrator 25 with the time constant $T_{Kfz} \sim J_{Kfz}$.

The resultant spring stiffness $C_{Kfz}$ is simulated by an integrator 24 with the time constant $T_{CKfz} \sim 1/C_{Kfz}$.

The attenuation $d_{Kfz}$ of the resultant natural frequency $\omega_{OKfz}$ is adjusted by means of a proportional element 27 with the amplification factor $K_{dKfz}$.

The time constants $T_{Kfz}$ and $T_{CKfz}$ and the amplification factor $k_{dKfz}$ may be calculated with the aid of an overriding drive simulation computer in keeping with the vehicle model implemented and used to control the integrators 24, 25 and the amplifier 27. For example, the time constant $T_{Kfz}$ is switched by the travel simulation computer if a shifting of the drive gear is to be simulated.

By means of an electric circuit layout corresponding to the left side of the structural diagram of FIG. 4, the configuration of the 3-mass oscillator is maintained accurately. Only the test stand rpm $\omega_{Pr}$ determined by a rpm meter 17 is returned to the electronic functional elements, but not a possibly existing measuring shaft signal $M_W$.

The signal $M_{Pr}$ emitted by the summation location 32 is a nearly wattless reference value formed by the electronic functional elements 24, 25, 27, 32, 33, and 34. A power amplifier is required to adjust this reference value to the high moments of the test stand, which in order to alter the ideal structure according to FIG. 4 as little as possible, should be a low-pass with a time constant as small as possible. This condition is satisifed advantageously by a dc shunt machine adjusted to the air gap moment $M_e$ (corrected for all losses). This makes possible, as mentioned above, extremely rapid moment controls. It shall be considered for the discussion below as a substitute low-pass with a substrate time constant $T_{Me}$.

In FIG. 5, this substitute low-pass is represented in the joint between the electronic functional elements and the mechanical structure as the block 34 drawn with a broken line. The block 34 comprises a moment control circuit, in which the air gap moment $M_e$ obtained from a moment computer, not shown, and equal in the stationary case to the shaft moment of the electronic machine, is subtracted in a different location 35 from the electronically determined signal of the test stand reference moment $M_{Pr}$. The different value is conducted through a moment control 36 in the form of a PI control to a current control circuit 37 of the electric machine.

The control of the moment of the electric machine by means of a measuring shaft signal, as proposed in the state of the art, is not acceptable in the present process. It is seen immediately in FIG. 5 that the use of the signal $M_W$ (corresponding to a measuring shaft built in between the test stand and the specimen) in place of the signal $M_e$ leads to an appreciable alteration of the structure compared to FIG. 4. Furthermore, the time constant $T_{Me}$ obtained with the signal $M_e$ would not be as small if the signal $M_W$ would be used. The moment control by means of the air gap is independent of the mechanics of the test stand.

The angular velocity $\omega_{Pr}$ is proportional to the rpm of the test stand. It is compared with a reference value $\omega_F$ and passed over a PI algorithm 24, 27, and 32. At the first glance, therefore a conventional rpm control circuit is present, which is adjusted for good attenuation and lower overshoot, i.e., it produces a hard coupling connection. The two embodiments claimed of the invention are of particular advantage, namely, the PI element 24, 27, and 32 are adjusted not in keeping with the usual stability criteria of a rpm control circuit, but with regard to the natural vibration behavior to be simulated of the 3-mass system to be reproduced. With the aforementioned drive simulation computer on the integrator 24 and the proportional element 27, the time constants $T_{CKfz}$ and the amplification factors $k_{dKfz}$ are set so that on the 3-mass system to be simulated, the natural frequency $\omega_{OKfz}$ and the attenuation $d_{Kfz}$ desired of the vehicle to be simulated are obtained. Consequently, the test specimen "sees" no difference between the vibration behavior of the test stand and the actual vehicle. $T_{CKfz}$ and $k_{dKfz}$ are free parameters whereby the natural frequencies and the attenuation of the vehicle may be set.

It should be mentioned the specimen $rpm_{VM}$ must not be applied to the comparator location 33 in place of the test stand rpm $\omega_{Pr}$, as this would lead to a structural change with respect to FIG. 4.

The integrator 25, forms with the time constant $T_{Kfz}$, the set variation of the velocity of the vehicle, which is characterized by the angular velocity $\omega_F$. It is an essential aspect of the invention that the moment $M_{Pr}$ is fed back from the summation location 32. The measuring element $M_W$ must not be used, as it is done in part in the state of the art. The use of $M_W$ would represent a change with respect to FIG. 4.

At the comparator location 34 according to the drawing, the stationary and quasistationary load moment $M_{Last}$ that is to act on the specimen (ascent, rolling resistance, air resistance, etc.) is fed in as the reference value.

In specifying the time constant $T_{Kfz} \sim J_{Kfz}$ of the integrator 25, it must be taken into consideration that part of the total vehicle inertia moment $J^*_{Kfz}(=J_{Pr}+J_{Kfz})$ is already present in $T_{Pr} \sim J_{Pr}$. This value $T_{Pr}$ is deducted in the driven simulation computer from the time constant $T^*_{Kfz}$, which corresponds to the total vehicle inertia moment $J^*_{Kfz}$, so that the effective integrator time constant for the integrator 25 amounts to $$T_{Kfz} = T^*_{Kfz} - T_{Pr}.$$

The process described above is suitable only for the amplification of the inertia moment, i.e., for the cases in which the test stand inertia moment $J_{Pr}$ is smaller than the total vehicle inertia moment $J^*_{Kfz}$ to be simulated. The limitation in the above-described process is $T_{Kfz} \to 0$, wherein the test stand inertia moment would act on the specimen in accordance with $T_{Pr}$. However, the integrator time constant $T_{Kfz}$ may be set only for a minimum value of $T_{Kfz} \geq T_{Kfzmin}$, for total vehicle inertia moments $J^*_{Kfz} \leq J_{Kfzmin} + J_{Pr}$ up to the limiting case of $J^*_{Kfz} = 0$ (decoupling). Therefore, the process described below for a decrease in the inertia moment is an advantageous further development of the invention.

According to FIG. 6, in an inner loop 38, 39, and 40 not only the test stand inertia moment $J_{Pr}$ is simulated away, but also a part $\Delta J_{VM}$ of the specimen inertia moment $J_{VM}$, which is exactly as large as the minimum time constant $T_{Kfzmin}$ that may be set on the integrator 25. A similar simulation loop is described in West German Offenlengungsschrift No. 32 25 035, in FIG. 3. However, it does not disclose the particular advantages resulting from the use of the simulation loop in case of a reduction of the test stand inertia moment in connection with the simulating process of the invention.

The simulation loop forms the relationship for a simulation moment $M'_{sim} = J'_{sim} \cdot d\omega'_{Pr}/dt$ that may be converted by the standardizing equation $M_n = J_{Pr}(d\omega'_{Pr}/dt)_{max}$ into the standardized form $$M_{sim} = J_{sim}/J_{Pr} \cdot d\omega_{Pr}/dt.$$

Herein $$J_{sim} = -(J_{Pr} + J_{Kfzmin}).$$

Block 38 is a differentiator which forms, with the differentiating time constant $T_{Pr}$, the angular acceleration $d\omega_{Pr}/dt$ from the rpm measured on the test stand machine. The different time constant $T_{Pr}$ here has the same value as the mechanical time constant of the test stand (Block 23). $T_v$ is the unavoidable time lag involved in any differentiation.

Block 39 is a proportional element and weighs the acceleration with the amplification factor $$J_{sim}/J_{Pr} = -(J_{Pr} + J_{Kfzmin})/J_{Pr},$$

so that the above cited simulation reference value $M_{sim}$ is obtained. In keeping with this reference value, the test stand machine produces by means of its moment control circuit 34, which in FIG. 6 is shown in a simplified manner as a time lag element with the time constant $T_{Me}$, the simulation moment, which simulates away the test stand inertia moment $J_{Pr}$ and the part $\Delta J_{VM} = J_{Kfzmin}$ from the test specimen.

Simultaneously, by the process described above for inertia moment amplification (outer simulation loop 24, 25, 27, 32, 33, and 34), the final vehicle inertia moment $J^*_{Kfz}$ desired, is simulated. This is effected by the blocks 25, 24, and 27, the comparator locations 32, 33, 34 and the feedbacks $M_{Pr}$ and $\omega_{Pr}$ according to FIG. 6.

In the process the time constant is set on the integrator 25 to $$T_{Kfz} = T^*_{Kfz} + T_{Kfzmin}$$

wherein $T^*_{Kfz}$ is given as a vehicle specific reference value by the overriding vehicle simulation computer. Therefore, the problem of having to specify an integration time $T_{Kfz} = 0$ is avoided. For example, for the case of $J^*_{Kfz} = 0$ (disengagement) on the integrator 25 the time constant $$T_{Kfz} = T_{Kfzmin}$$

is effective, which eliminates the effect of the inertia moment $\Delta J_{VM} = J_{Kfzmin}$ which had been simulated away in excess.

The process according to FIG. 6 is applied to the inertia moment range of $$0 \leq J^*_{Kfz} \leq J_{Kfzmin} + J_{Pr}.$$

In the case of an activated simulation loop, to simulate a reduction in the moment of inertia in an advantageous manner, the time constant $T_{CKfz}$ of the proportional element 27 is set by the drive simulation computer to values customarily used with a conventional rpm controller, i.e., for good attenuation and a slight overshoot, together with good steering behavior. Such a conventional setting is appropriate because in view of the inner simulation, the control structure becomes so complex that the parameters relating to the natural frequencies and the attenuation can no longer be set in a straightforward manner. The time constant $T_{CKfz}$ and the amplification factor $K_{dKfz}$ are, for example, determined at the startup of the test stand and are stored in the drive simulation computer.

For the inertia moment range $$J^*_{Kfz} \leq J_{Kfzmin} + J_{Pr}$$

the inner simulation loop in FIG. 6 is interrupted by a switching element 41, located between the comparator location 40 and the proportional element 39, so that the simulation process passes into the process according to FIG. 5 (inertia moment amplification).

The specification for the input of the time constant on the integrator 25 then is:

$$T_{Kfz} = T^*_{Kfz} - T_{Pr},$$

wherein $T^*_{Kfz}$ is again given by the vehicle simulation computer as a vehicle specific reference value.

The switching between the simulation of an inertia moment amplification (according to FIG. 5) and an inertia moment reduction (according to FIG. 6, with the switching element 41 closed) is entirely without problems, which constitutes a particular advantage of the process according to the invention. It is merely necessary to have a drive simulation computer switch over the time constants $T_{Kfz}$ and $T_{CKfz}$, the amplification factor $k_{dKfz}$ and the switching element 41. The actuation and deactivation of the inner simulation circuit by the switching element 41 presents no problem, as it is not necessary to follow it up. The switching of the integrating time constant again presents no problem. It is being performed constantly in any case for varying reference value inputs for $T_{Kfz}$ and $T_{CKfz}$ (for example upon shifting) in keeping with the inertia moment and the natural frequency, by the vehicle simulation computer.

The essential advantages of the process according to the invention, together with the associated circuit layout, may be found in that they are not subject to the stability restrictions of the known processes in the simulation of large inertia moments. Additionally, it is possible according to the invention to simulate the moment of inertia by means of simply determined parameters so that it will correspond to the elastic coupling of the inertia moment to the test specimen in an actual vehicle. Important natural frequencies and the associated attenuations of the rotating vehicle motion may be taken into consideration in the new process. There is no unalterable joining of the simulated inertia moment as with the use of disk flywheels or in the processes of the electric simulation of the inertia moment according to the state of the art, but a planned adaptation to the dynamics of the vehicle.

The precondition of an advantageous application of the process is a small mechanical inertia moment of the test stand;

The inertia moment reduction with electric simulation rapidly attains stability and dynamic limits.

In the case of excessively small inertia moments to be simulated, there are high accelerations. If simultaneously the test stand would have a high moment of inertia, the difference $J_{sim}$ between the test stand inertia moment and the inertia moment desired would be so large that the simulation moment $M_{sim} = J_{sim} d\omega/dt$ would be larger than the nominal moment of the machine.

The small test stand inertia moment required is obtained advantageously by the use of a dc shunt machine designed for low inertia. Optionally, a low speed machine adaption gearing is used, which effects a reduction of the inertia moment with the square of the gear ratio. The adaption gear may be for example a slackless traction gear (according to Application No. 33 19 525.0-52). The advantage of the dc shunt machine consists of the high moment control dynamics that may be attained and of the accuracy of the moment computer required. The accuracy of the inertia moment simulation is a function of the accuracy of moment control and thus of the accuracy of the moment computer.

FIG. 7 demonstrates how several, (m) masses with spring constants and attenuations may be simulated by means of electronic functional elements. The mechanical part of the test stand and the test specimen are contained therein, as in FIG. 4, to the right of the line I—I as a two-mass system. To the left of the line I—I, electronic functional elements are shown, which may be combined in m units. Each of the m units, of which only the first and the mth unit are shown, represents an electronically simulated mass. The points in FIG. 7 indicate the units (2 to m−1) not shown. In the indices the last digit (1, 2 ... m) identifies the unit concerned.

What is claimed is:

1. An apparatus for simulation of moments of inertia on a test stand comprising:
   a test stand and a test specimen represented as an n-mass oscillator, wherein said masses are joined elastically with each other, said masses having spring constants $C^{n-1}$ and attenuation measures $d^{n-1}$;
   means for electronic simulation of a system of additional m masses with spring constants and attenuations according to a differential equation system for a n+m mass system;
   means for transmission of controlled torque to and n masses responsive to a torque set valve generated by said means for electronic simulation.

2. An apparatus according to claim 1, wherein the test stand and the test specimen are a 2-mass oscillator, n=2, the mass of the specimen and the mass of the test stand being connected by an elastic shaft, and wherein the means for electronic simulation simulates one mass, m=1, with a moment of inertia $J_{Kfz}$.

3. An apparatus as in claim 2 wherein said means for electronic simulation comprises integrator means with time constant $T_{Kfz}$ proportional to $J_{Kfz}$ for simulating said moment of inertia.

4. An apparatus as in claim 3, wherein said means for electronic simulation further comprises means for simulating the spring stiffnesses between the electronically simulated moments of inertia $J_{Kfz}$ and the n-mass oscillator so that they correspond to the natural vibration behavior of the n+m-mass system.

5. An apparatus as in claim 4, wherein said means for electronic simulation further comprises means for adjusting the attenuation of the n+m-mass system so that a natural vibration behavior is simulated in the n+m-mass system.

6. An apparatus as in claim 5, wherein the means for transmission comprises a dc shunt machine, said shunt machine is being adjusted to the air gap moment ($M_e$) corrected for losses.

7. An apparatus as in claim 6, wherein said means for electronic simulation further comprises a reduction means for subtracting a simulated moment $M_{sim}$ generated by differentiating a measured value of the angular velocity $\omega_{Pr}$ of the test stand and multiplied by a factor corresponding to the amount of the reduction of the inertia moment from a test stand reference moment $M_{Pr}$ prior to its input into the means for transmission.

8. An apparatus as in claim 7, wherein that the factor whereby the angular acceleration $d\omega_{Pr}/dt$ is multiplied is proportional to the sum of the test stand inertia moment $J_{Pr}$ and a minimally adjustable electrically simulated inertia moment $J_{Kfzmin}$.

9. An apparatus as in claim 1, wherein means for electronic simulation comprises means for simulating at least one mass with the inertia moment $J_{Kfz}$, means for simulating a spring with a spring constant $C_{Kfz}$, and attenuation means with an attenuation measure $d_{Kfz}$.

10. An apparatus as in claim 9, wherein said means for electronic simulation further comprises a control means for the generation of a test stand moment $M_{Pr}$ signal,
    first means for subtracting the test stand moment signal $M_{Pr}$ from a specifiable load moment $M_{Last}$,
    integrator means, responsive to said means for subtracting, for generating an angular velocity $\omega_F$, corresponding to a vehicle velocity to be simulated,, second means for subtracting test stand angular velocity $\omega_{Pr}$ from the angular velocity $\omega_F$,
    means for generating test stand moment signal responsive to the second means for subtracting, wherein said means for transmission further comprises an air gap moment controlled means for the formation of a moment responsive to said test stand moment signal, wherein the actual value of the air gap is corrected by the losses of the means for transmission.

11. An apparatus as in claim 10, wherein said means for generating test stand moment signal comprises, in parallel, means for integrating to simulate a spring with a spring constant $C_{Kfz}$, and attenuation means.

12. An apparatus as in claim 11, wherein said integrating means further comprises an adjustable time constant $T_{CKfz}$ means for setting a simulated vehicle natural frequency $\omega_{OKfz}$.

13. An apparatus as in claim 12, wherein said attenuation means further comprises an amplification factor $K_{dKfz}$ means for setting the attenuation $d_{Kfz}$ of the mass system to be simulated.

14. An apparatus as in claim 13, further comprising inner simulation means for differentiating the test; means for attenuating responsive to means for differentiating wherein the differentiated signal is multiplied by an amplification factor corresponding to a simulation inertia moment $J_{sim}$ for generating a simulation moment $M_{sim}$ and means for subtracting said simulation moment from the test stand moment $M_{Pr}$ signal for supplying the means for transmission, wherein the simulation inertia moment is $J_{sim} = -(J_{Pr} + J_{Kfzmin})$ and wherein $J_{Kfzmin}$ is chosen as large as permitted by the smallest possible time constant $T_{Kfzmin}$ on the means for integrating.

15. An apparatus as in claim 14, wherein said inner simulation means further comprises a switching element which enables the inner simulation means when a reduction of the test stand inertia moment is to be simulated.

16. An apparatus as in claim 15, wherein when a reduction of the test stand inertia moment is to be simulated, the time constant $T_{Kfz}$ of the means for integrating is set so that it follows the relationship $T_{Kfz} = T^*_{Kfz} + T_{Kfzmin}$, with $T^*_{Kfz}$ being proportional to a vehicle inertia moment $J^*_{Kfz}$ desired and $T_{Kfzmin}$ being the smallest time constant that may be set on the means for integrating.

17. An apparatus as in claim 16, wherein a simulation of the test stand inertia moment, the time constant of the means for integrating and the amplification factor attenuation means switched to values that are customary with a conventional rpm controller.

* * * * *